US012602372B1

(12) United States Patent
Mills-Campisi et al.

(10) Patent No.: US 12,602,372 B1
(45) Date of Patent: Apr. 14, 2026

(54) SYSTEM AND METHOD FOR QUERY AUGMENTATION FOR GENERATING RESPONSES

(71) Applicant: ACCENTURE GLOBAL SOLUTIONS LIMITED, Dublin (IE)

(72) Inventors: Adam Kerry Mills-Campisi, Seattle, WA (US); Ramya Narasimhan, Chennai (IN); Ravi Kiran Velama, Bangalore (IN); Sankar Narayan Das, Barrackpore (IN); Kuntal Dey, Birbhum (IN); Vikrant Kaulgud, Bangalore (IN); Adam Patten Burden, Tampa, FL (US); Kaushik Amar Das, Guwahati (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 19/169,776

(22) Filed: Apr. 3, 2025

(51) Int. Cl.
G06F 16/24 (2019.01)
G06F 16/242 (2019.01)
(Continued)

(52) U.S. Cl.
CPC .......... *G06F 16/24* (2019.01); *G06F 16/2423* (2019.01); *G06F 16/243* (2019.01); *G06F 16/2452* (2019.01); *G06F 16/24535* (2019.01); *G06F 16/2455* (2019.01); *G06F 16/248* (2019.01); *G06F 16/3329* (2019.01); *G06F 16/33295* (2025.01)

(58) Field of Classification Search
None
See application file for complete search history.

(56) References Cited

U.S. PATENT DOCUMENTS

2025/0238470 A1* 7/2025 Penta .................... G06F 16/907

OTHER PUBLICATIONS

Lin et al., "Learning Entity and Relation Embedding for Knowledge Graph Completion", 2015 (Year: 2015).*

(Continued)

*Primary Examiner* — Neveen Abel Jalil
*Assistant Examiner* — John J Morris
(74) *Attorney, Agent, or Firm* — Mannava & Kang, P.C.

(57) ABSTRACT

System and method for query augmentation for generating responses is disclosed. The method includes, receiving an input data from a user device, determining a context of the received input data, determining a domain specific graphical knowledge schema corresponding to the received input data, and identifying a plurality of missing entities by analyzing the determined context and at least one graphical instance corresponding to the determined appropriate domain specific graphical knowledge schema. The method further includes, prioritizing the identified plurality of missing entities, generating at least one sub-query for each of the identified plurality of missing entities and retrieving a relevant content corresponding to the generated at least one sub-query using a RAG-based system. The method further includes, generating at least one response to the received input data by augmenting the received input data with the retrieved relevant content, and outputting the generated at least one response on a user interface of the user device and updating the at least one graphical instance with the retrieved relevant content.

18 Claims, 9 Drawing Sheets

(51) Int. Cl.

| | |
|---|---|
| G06F 16/2452 | (2019.01) |
| G06F 16/2453 | (2019.01) |
| G06F 16/2455 | (2019.01) |
| G06F 16/248 | (2019.01) |
| G06F 16/3329 | (2025.01) |

(56) References Cited

OTHER PUBLICATIONS

Gao et al., "Retrieval-Augmented Generation for Large Language Models: A Survey", 2023 (Year: 2023).*

Arnold Filtser et al., Labelings vs. Embeddings: On Distributed and Prioritized Representations of Distances, Discrete Computational Geometry, Springer, Sep. 15, 2023, 23 pages. (https://doi.org/10.1007/s00454-023-00565-2).

Hongbin Ye et al. "Ontology-enhanced Prompt-tuning for Few-shot Learning" arXiv:2201.11332v1 [cs.CL] Jan. 27, 2022 (11 Pages).

Pin Ni et al., "Knowledge Graph and Deep Learning-based Text-to-GraphQL Model for Intelligent Medical Consultation Chatbot", Information Systems Frontiers, pp. 137-156, Springer, Jul. 6, 2022.

Soren Auer et al., "Towards a Knowledge Graph for Science", National Science Foundation: Science and Engineering, WIMS 'Jun. 18, 2018, Novi Sad, Serbia, 6 pages.

Ziaohui Li et al., "Complex Embedding with Type Constraints for Link Prediction", Entropy, MDPI, Feb. 25, 2022, pp. 1-19.

Yuhuan Lu et al., "Schema-Aware Hyper-Relational Knowledge Graph Embeddings for Link Prediction", Journal of Latex Class Files, vol. 14, No. 8, Aug. 2015, pp. 1-15.

* cited by examiner

RECEIVE INPUT (M_E, K_I, C, AND K_S) ⌐ 405

GENERATE KNOWLEDGE POOL (K_P) BASED ON THE INPUT (K_I, C) ⌐ 410

GENERATE WORD EMBEDDINGS OF (M_E) ⌐ 415

ESTIMATE DISTANCE D(ELEMENT, K_P) FOR ALL THE ELEMENTS OF (M_E) ⌐ 420

PRIORITIZE ALL ELEMENTS OF (M_E) BASED ON THE DISTANCE D(ELEMENT, K_P) ⌐ 425

BREAK TIES OF PRIORITIES BASED ON (K_S) ⌐ 430

ORDER THE ELEMENTS OF (M_E) IN A NON-ASCENDING PRIORITY LIST (P_E) AND RETURN (P_E) ⌐ 435

| Entity | Word Embeddings |
|--------|-----------------|
| Location | [1, 3] |
| Copay | [2, 3] |
| K_P | [[1,2], [2,1], [1,1], [2,2]] |

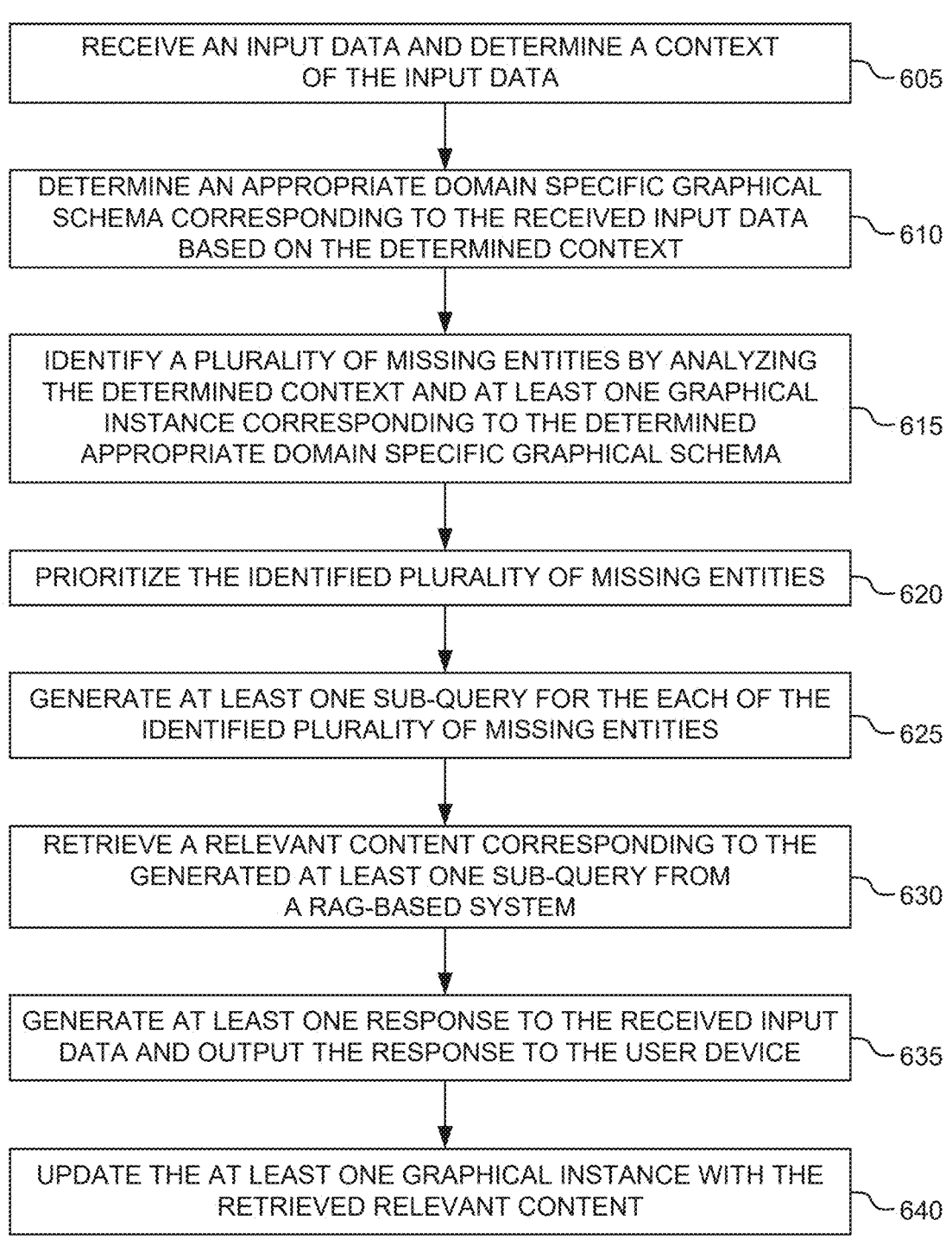

RECEIVE AN INPUT DATA AND DETERMINE A CONTEXT
OF THE INPUT DATA ⌐605

DETERMINE AN APPROPRIATE DOMAIN SPECIFIC GRAPHICAL
SCHEMA CORRESPONDING TO THE RECEIVED INPUT DATA
BASED ON THE DETERMINED CONTEXT ⌐610

IDENTIFY A PLURALITY OF MISSING ENTITIES BY ANALYZING
THE DETERMINED CONTEXT AND AT LEAST ONE GRAPHICAL
INSTANCE CORRESPONDING TO THE DETERMINED
APPROPRIATE DOMAIN SPECIFIC GRAPHICAL SCHEMA ⌐615

PRIORITIZE THE IDENTIFIED PLURALITY OF MISSING ENTITIES ⌐620

GENERATE AT LEAST ONE SUB-QUERY FOR THE EACH OF THE
IDENTIFIED PLURALITY OF MISSING ENTITIES ⌐625

RETRIEVE A RELEVANT CONTENT CORRESPONDING TO THE
GENERATED AT LEAST ONE SUB-QUERY FROM
A RAG-BASED SYSTEM ⌐630

GENERATE AT LEAST ONE RESPONSE TO THE RECEIVED INPUT
DATA AND OUTPUT THE RESPONSE TO THE USER DEVICE ⌐635

UPDATE THE AT LEAST ONE GRAPHICAL INSTANCE WITH THE
RETRIEVED RELEVANT CONTENT ⌐640

FIG. 6

SYSTEM AND METHOD FOR QUERY AUGMENTATION FOR GENERATING RESPONSES

TECHNICAL FIELD

The present disclosure generally relates to the field of artificial intelligence systems and knowledge graphs, and, more particularly, to a system and methods for query augmentation for generating responses.

BACKGROUND

Knowledge graphs (KGs) are instrumental in the effective storage and organization of extensive, real-time data, supporting applications such as Question and Answering (Q&A), fact-checking, semantic search, and recommendations. The structured format and domain-specific knowledge of the KGs significantly enhance the quality of such applications. However, KGs are inherently limited by their incompleteness and the risk of becoming outdated as new information emerges. This presents a challenge for maintaining the accuracy and relevance of the outputs generated by KG-based systems.

In parallel, advancements in Large Language Model (LLM) based Retrieval Augmented Generation (RAG) systems have shown promise in producing responses that are both contextually appropriate and informative. The RAG based systems can dynamically retrieve information from a wide array of sources, making them more adaptable to the ever-changing landscape of knowledge. Nonetheless, RAG based systems generally operate at slower speeds than traditional KG-based systems, which can hinder their usability in real-time applications where quick responses are crucial. Furthermore, RAG based systems are costly due to the application programming interface (API) access costs of LLMs. Hence, the conventional KG-based systems often fail to provide information due to their incompleteness and lack of knowledge, and the LLM based RAG systems are slower in generating the responses.

SUMMARY

This summary is provided to introduce a selection of concepts in a simple manner that is further described in the detailed description of the disclosure. This summary is not intended to identify key or essential inventive concepts of the subject matter, nor it is intended for determining the scope of the disclosure.

A method for query augmentation for generating responses is disclosed. The method includes, receiving an input data for performing a task from a plurality of data sources, wherein the input data comprises at least one of a natural language query received from a user device. Upon receiving the input data, a context of the received input data is determined by parsing at least one keyword comprised within the received input data and an appropriate domain specific knowledge graphical schema corresponding to the received input data is determined based on the determined context. Further, a plurality of missing entities are identified by analyzing the determined context and at least one graphical instance corresponding to the determined appropriate domain specific graphical knowledge schema, wherein each of the at least one graphical instance corresponds to one of an explicit missing entity and an implicit missing entity and the identified plurality of missing entities are prioritized based on a distance between the identified plurality of missing entities from the determined context and the analysed at least one graphical instance. Then, at least one sub-query is generated for the each of the identified plurality of missing entities based on the priority and a relevant content corresponding to the generated at least one sub-query is retrieved from a plurality of external data sources using a Retrieval Augmented Generation (RAG) model. Based on the retrieved relevant content, at least one response to the received input data is generated by augmenting the received input data with the retrieved relevant content, and the response is presented on a user interface of the user device and the at least one graphical instance is updated with the retrieved relevant context.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which:

FIG. 6 depicts a flowchart illustrating a method for generating a response to a query, in accordance with an embodiment of the present disclosure.

Like reference numbers and designations in the various drawings indicate like elements.

DETAILED DESCRIPTION

Figure 1:
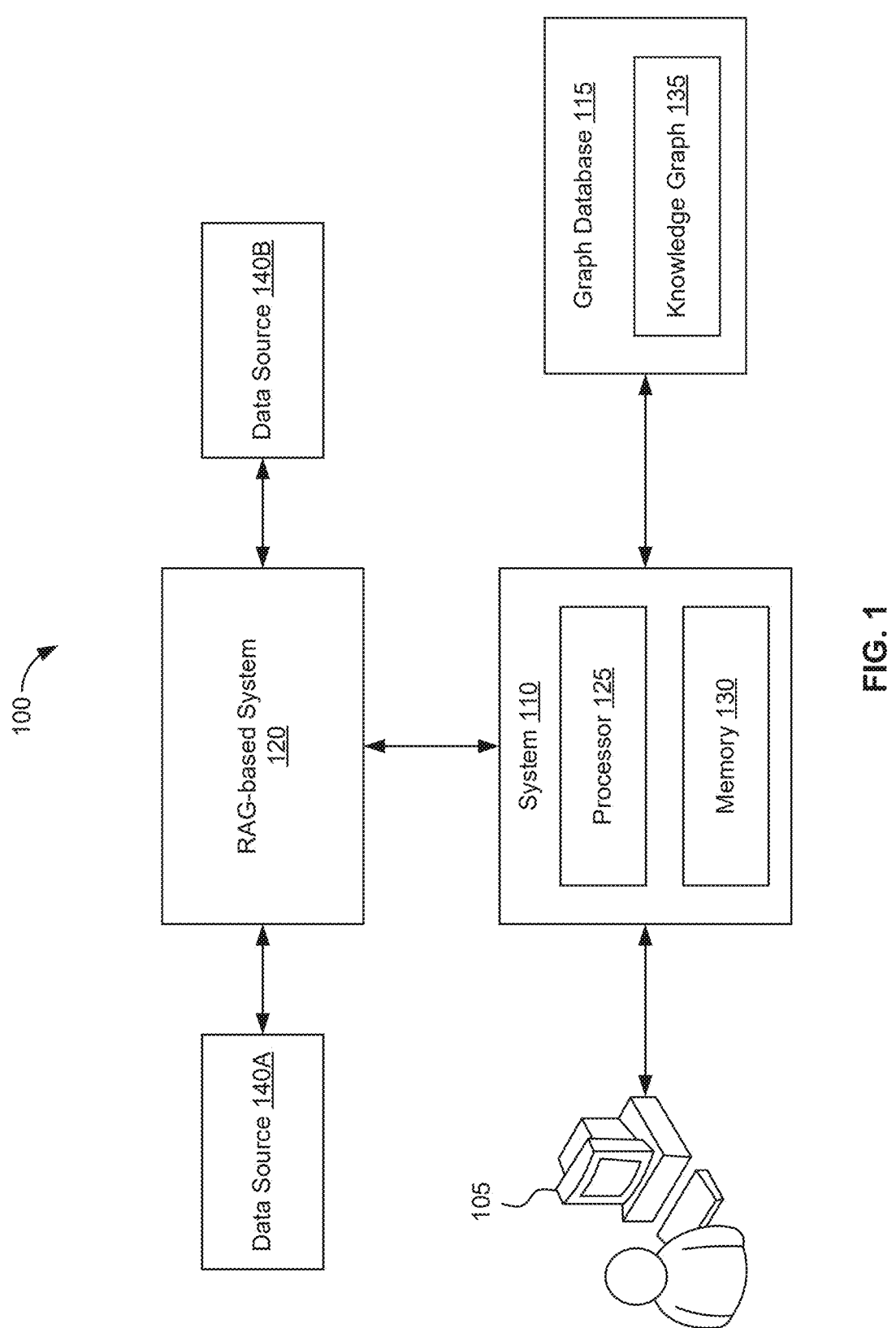
FIG. 1 depicts an example environment for generating a response to a query, in accordance with implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

To address the one or more limitations described in the background, embodiments of the present disclosure describe a system and method for query augmentation for generating responses. Specifically, the system utilizes a Knowledge Graph (KG) and RAG-assisted system to enhance response generation by retrieving contextual missing information from source documents and other relevant materials when necessary. This context-specific information aids the system in producing more accurate responses to a given query. The system focuses on the query augmentation process, which enables the generation of responses from a RAG-assisted KG-based system when the KG is unable to provide relevant information due to its incompleteness. Additionally, the system enhances the incomplete KG instance using the retrieved information, thereby improving overall response quality. For example, upon receiving a query from a user, the system initially determines a context of the query and based on the determined context, the system identifies a relevant part from the knowledge schema from a domain specific KG. Then, the system analyses the determined context and at least one graphical instance corresponding to the determined appropriate domain specific graphical schema to determine if the content relevant to the context is present in the KG or not. If the content is present, then the system fetches the content and presents on an interface of the user device. Else, the system identifies one or more missing information from the at least one graphical knowledge schema, prioritizes the missing information based on the given graphical knowledge schema and the context, augments the query based on the prioritization and retrieves the missing information with the help of the RAG based system, also referred to as RAG framework, which extracts relevant information from one or more sources and documents. That is, the system identifies the missing information using the graphical knowledge schema and corresponding graphical instance of the knowledge graph. Upon retrieving the relevant information, the system presents the relevant information to the user as a reply to the given query and further updates the incomplete KG instance based on the retrieved information and the prioritized concepts. It is important to note that the terms 'content' and 'information' are used interchangeably in this disclosure. Additionally, the terms 'element' and 'entity' are also treated the same. Further, the term 'graphical schema' and 'graphical knowledge schema' are used interchangeably.

FIG. 1 depicts an example environment 100 for generating a response to a query, in accordance with implementations of the present disclosure. As shown, the environment includes a user device 105, a system 110 for generating a response, a graph database 115 and a Retrieval-Augmented Generation (RAG) based system 120. It is to ne noted that the example environment 100 shown includes one user device 105, one graph database 115, and one RAG-based system 120. However, there may be multiple instances of these elements in the environment.

The components 105 to 120 of the example environment 100 may communicate with each other using a network (not shown). In some examples, the network may include a Local Area Network (LAN), a Wide Area Network (WAN), the Internet, or a combination thereof. In some examples, the network may be accessed over a wired and/or a wireless communication link.

The user device 105 may be any electronic communication device associated with a user. In some examples, the user device 105 may include a desktop, smartphones, laptops, a tablet, and/or the like. The user device 105 may present one or more user interfaces (e.g., Graphical User Interfaces (GUIs)) of a workspace for the user to interact with the system 110. The user device 105 may be used to provide input and/or receive output to/from the system 110. The input or the input data may include a query, and the output may include a response for the query. It should be noted that terms "query response," "response," and "answer" may be used interchangeably throughout the document.

In an embodiment, the system 110 may be implemented as an on-premises system that is operated by an enterprise or a third-party engaged in cross-platform interactions and data management. In some examples, the system 110 may be implemented as an off-premises system (for example, cloud or on-demand) that is operated by an enterprise or a third-party on behalf of an enterprise. In some examples, the system 110 may be implemented in a cloud environment. For simplicity, the system 110 depicted in FIG. 1 may be a cloud environment that is intended to represent various forms of servers including a web server, an application server, a proxy server, a network server, a server pool, and/or the like.

In some examples, the system 110 may be implemented by way of a single device or a combination of multiple devices that may be operatively connected or networked together. The system 110 may be implemented in hardware or a suitable combination of hardware and software. The "hardware" may include a combination of discrete components, an integrated circuit, an application-specific integrated circuit, a field-programmable gate array, a digital signal processor, or other suitable hardware. The "software" may include one or more objects, agents, threads, lines of code, subroutines, separate software applications, two or more lines of code, or other suitable software structures operating in one or more software applications. Referring to FIG. 1, the system 110 includes a processor 125 and a memory 130 communicably coupled to the processor 125. The processor 125 may include one or more processors. Examples of the processor 125 may include, but are not limited to, microprocessors, microcomputers, microcontrollers, digital signal processors, central processing units, state machines, logic circuits, and/or any devices that manipulate data or signals based on operational instructions. Among other capabilities, the processor 125 may fetch instructions (also be referenced to as processor-executable instructions or machine-executable instructions) from the memory 130 and execute the fetched instructions for performing operations according to the present disclosure. The memory 130 may be non-volatile or non-transitory computer-readable medium (CRM) such as, a magnetic disk or solid-state non-volatile memory or volatile medium such as Random Access Memory (RAM), and/or the like.

The graph database 115 stores a knowledge graph 135 which is a structured representation of information that captures entities and relationships in a graph format. In an embodiment, the knowledge graph 135 combines data from various sources to create a comprehensive view of knowledge, wherein the data may be used to provide responses and recommendations to the end users. The knowledge graph 135 includes entities representing the distinct concepts or objects, edges defining the relationship between the entities, or example how entities are related to one another, and attributes, which are additional details about the entities or relationships, providing properties, context and metadata. The specifies the types of entities, the relationships, and the properties that can be associated with both entities and relationships are defined by graphical schema and instances are the actual data entries that conform to the schema. It is to be noted that the graph database 115 storing the knowledge graph 135 may be a part of the system 110 or an external entity.

The RAG-based system 120 uses retrieval-Augmented Generation (RAG) techniques/framework to enhance the capabilities of natural language processing (NLP) tasks, particularly in tasks such as response generation, dialogue systems, and content generation. The RAG-based system 120 includes a retrieval module for fetching relevant information from one or more data sources 140A and 140B, herein the retrieval module uses techniques such as vector embeddings, BM25, or other search algorithms to find the most relevant information based on a given query. Further, the RAG-based system 120 may include a generation module generates coherent and contextually appropriate responses, wherein the generation module transformer-based models (like GPT, BERT, etc.) that are fine-tuned for specific tasks. It is to be noted that the RAG-based system 120 may only be configured to fetch relevant information from one or more data sources 140A and 140B, and the fetched relevant information may be used by the system 110 to generate the response to an input query by the end user.

As described, the user device 105, the system 110 for generating a response, the graph database 115 and the RAG-based system 120 are communicatively connected through the communication network. Further, a user may use the user device 105 for feeding the input data to the system 100, wherein the input data includes at least a natural language query. That is, the user may use the user device 105 to send a query to the system 100 for receiving a response. Upon receiving the input data, that is the query, the system 110 initially determines a context of the query and based on the determined context, the system 110 identifies a relevant domain-specific graphical schema from the KG 135. It is to be noted that the KG 135 include one or more graphical schema and one relevant schema is identified based on the determined context. Then, the system 110 analyses the determined context and at least one graphical instance corresponding to the determined appropriate domain specific graphical schema to determine if the content relevant to the context is present in the KG 153 or not. If the content is present, then the system 110 fetches the content and presents on an interface of the user device 105. Else, the system 110 identifies one or more missing information from the at least one graphical instance, prioritizes the missing information based on the given KG instance and the context, augments the query based on the prioritization and retrieves the missing information with the help of the RAG based system 120 which extracts relevant information the one or more sources 140A and 140B, and/or documents. Upon retrieving the relevant information, the system 110 presents the relevant information to the user and further updates the incomplete KG instance based on the retrieved information and the prioritized concepts. The manner in which system 110 performs various functions is described in detail below.

Figure 2:
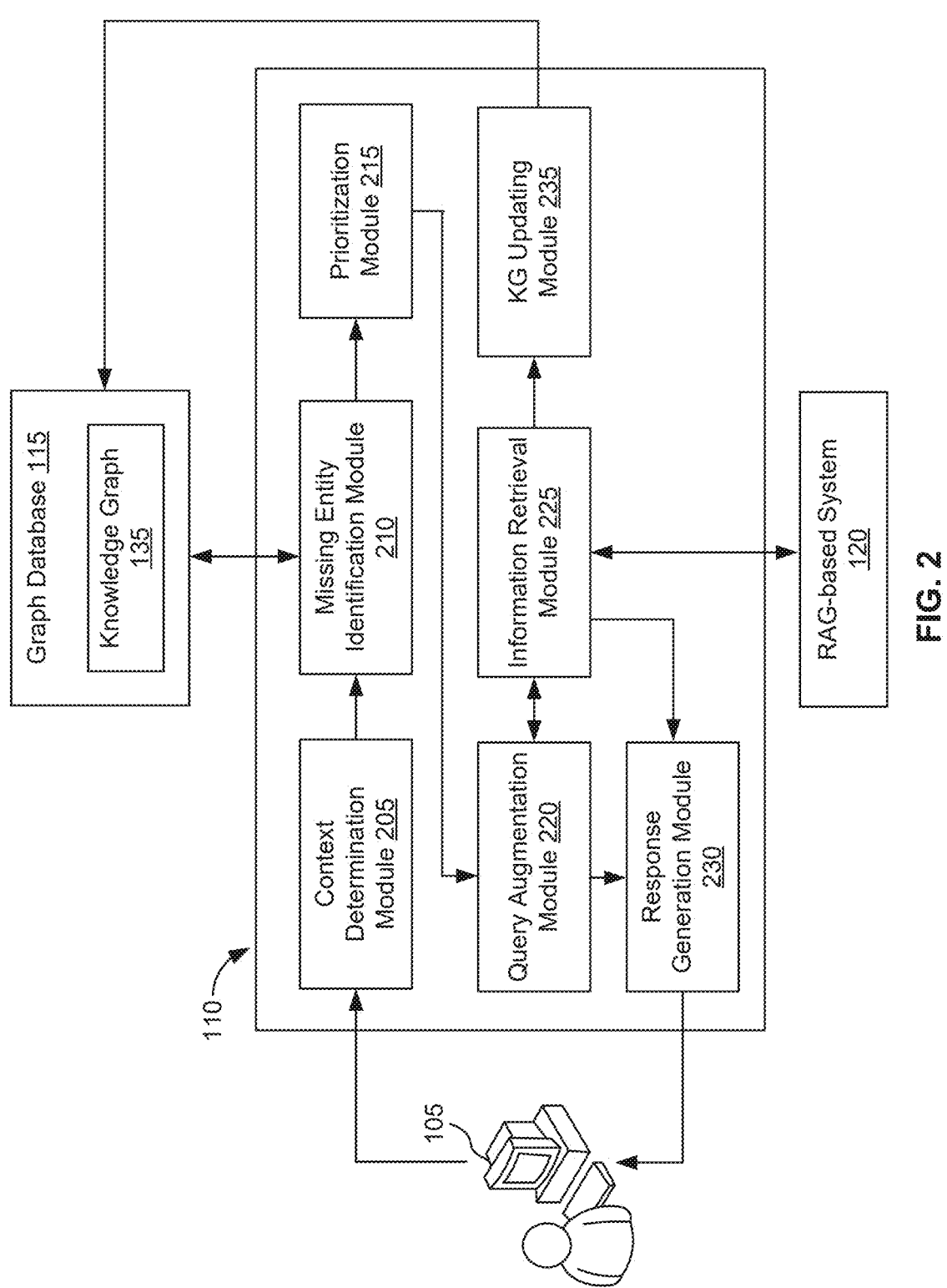
FIG. 2 depicts a block diagram of the system for generating a response to a query, in accordance with an embodiment of the present disclosure.

FIG. 2 depicts a block diagram of the system for generating a response to a query, in accordance with an embodiment of the present disclosure. In one embodiment, in addition to the processor 125 and the memory 130, the system 110 includes a context determination module 205, a missing entity identification module 210, a prioritization module 215, a query augmentation module 220, an information retrieval module 225, a response generation module 230 and KG updating module 235.

In an embodiment, upon receiving the input data from the user device 105, the context determination module 205 determines a context of the received input data by parsing at least one keyword present within the received input data. The input data as described herein includes at least a natural language query for performing a task, wherein the task may be related to fetching information. For example, the query may include "How much does Mr. X need to pay for the X-ray?". Upon receiving the query, the context determination module 205 determines the context of the query, wherein the context may be determined using the chat-history, the user-profile, the session information, geography, topic relevance, and the like.

In an embodiment of the present disclosure, upon determining the context, the missing entity identification module 210 identifies the triplets in the context (C_T). That is, the missing entity identification module 210 determines a set of triplets (Subject-Predicate-Object) using natural language processing techniques such as Named Entity Recognition (NER), and Parts of Speech Tagging. For example, upon determining the context, the missing entity identification module 210 may use the NER models to identify and classify entities in the context into predefined categories (e.g., person, organization, place, etc.). Further, grammatical structure of sentence is analyzed to identify relationships between words and hence to determine the subject, the predicate, and the object. Then the identified subject, predicate, and object are combined to form the triplets.

Further, the missing entity identification module 210 identifies triplets in the receive input query (Q_T). That is, the missing entity identification module 210 determines a set of triplets (Subject-Predicate-Object) from the input query using natural language processing techniques such as Named Entity Recognition (NER), and Parts of Speech Tagging. Upon determining the triplets in the context (C_T) and triplets in the query (Q_T), the missing entity identification module 210 generates a union of the triplets. That is, the missing entity identification module 210 generates a conjugate list of (C_T) and (Q_T) by performing union operation on individual lists, and the conjugate list may be denoted as:

$$\text{Conjugate list}(F\_T) = (C\_T) \cup (Q\_T) \qquad \text{Eq. (1)}$$

Then, in an embodiment of the present disclosure, the missing entity identification module 210 identifies an appropriate domain specific graphical schema corresponding to the received input data based on the determined context. In one implementation, based on the entities identified in the context and the appropriate domain specific graphical schema, the triplets (Q_T) are determined. In an alternative embodiment, the triplets in the conjugate list (F_T) are used to identify the appropriate domain specific graphical schema. Hence, the Conjugate list (F_T) may be determined based on the combination of the triplets determined from the context, and the input query.

Then the missing entity identification module 210 uses an appropriate domain specific graphical schema along with each triplet in the conjugate list (F_T) to query the knowledge graph 135. Specifically, the missing entity identification module 210 converts the triplet (Subject, Predicate, Object) into a format suitable for querying the KG 135, such as SPARQL for an RDF-based KG. Then a query is constructed and executed, for example using an HTTP client, to send the query to the KG 135 while adhering to the appropriate domain specific graphical schema. Upon receiving the query, the system associated with the KG 135 analyses the graphical instance corresponding to the determined appropriate domain specific graphical schema based on the received query. If the query returns relevant information based on the triplet, the information is extracted from the KG 135 and the response generation module 230 generates a response to the initial input query from the user, and the response is presented to the user through a user interface of the user device 105. If querying the KG 135 with a triplet returns no results (null), then such triplets are added to set(S). Hence, the set(S) stores the triplets and keeps track of the triplets for which no information could be found in the KG 135. Hence, the set(S) indicates the information missing in the KG 135, wherein the missing information may include one or more of an explicit missing information and implicit missing information. The term "explicit missing information" as described herein refers to the information found in the context but missing in the given KG instance. The term "implicit missing information" as described herein refers to the information found in the KG schema but missing in the given KG instance.

Figure 3A:
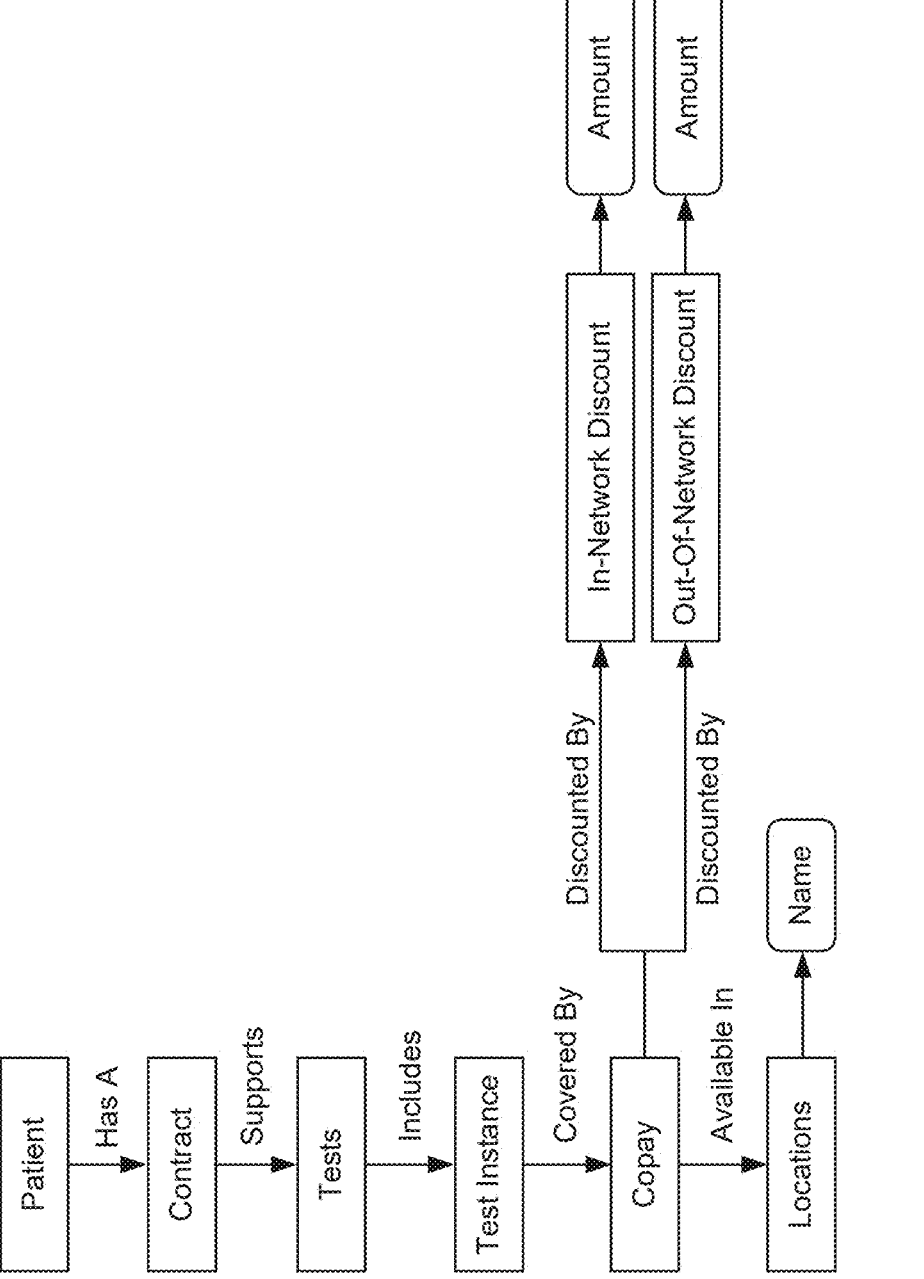
FIG. 3A and FIG. 3B depicts a knowledge graph schema for patients and a knowledge graph instance for a particular patient, respectively.
Figure 3B:
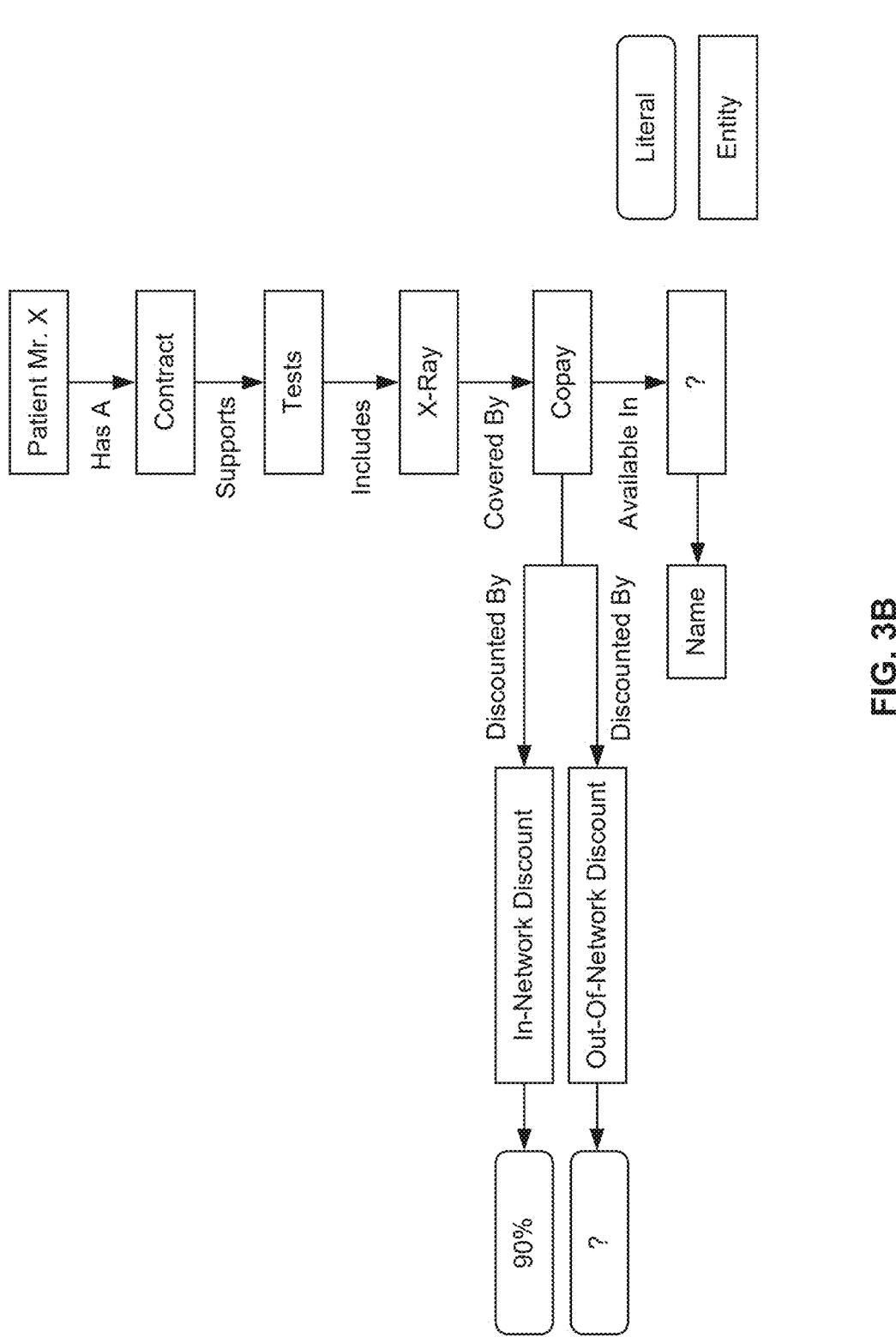

FIGS. 3A and 3B depicts a knowledge graph schema for patients and a knowledge graph instance for a particular patient, respectively. The knowledge graph schema depicts different entities and relationships between different entities. Considering an input query "How much does Mr. X need to pay for the X-ray?" from the user Mr. X, the context determination module 205 may determine the location of the user as "Location A", based on the geographical location of Mr. X. Hence the entities found from the context information is "Location A". Further, the entities found from query includes "copay" and "X-ray", wherein "copay" is identified based on the term "pay" in the input query. Based on these, the missing entity identification module 210 identifies relationship from the knowledge graph schema, which may be depicted as:

[(X-ray, covered by, copay); (copay, discounted by, In-Network), (copay, discounted by, Out-of-network), (copay, available in, locations)]

When a query is generated based on the above triplets, the system associated with the KG 135 returns null for the triplets [(copay, discounted by, Out-of-network), (copay, available in, locations)] since the amount for out-of-network discount and the locations where copay available are missing in the KG instance shown in FIG. 3B. Hence, the missing entity identification module 210 creates a set(S) which includes the triplets [(copay, discounted by, Out-of-network), (copay, available in, locations)] indicating the missing entities in the KG 135.

Referring to FIG. 2, upon identifying the missing entities, the prioritization module 215 prioritize the identified plurality of missing entities based on a distance between the identified plurality of missing entities from the determined context and the analysed at least one graphical instance. In an embodiment of the present disclosure, the input to the prioritization module 215 are the list of identified missing entities, the KG instance, the context and the KG schema. Upon receiving the input, the prioritization module 215 generates a plurality of word embeddings for each of the identified plurality of missing entities, the determined context, the at least one graphical instance and the determined appropriate domain specific graphical schema and embeds a plurality of elements to each of the generated plurality of word embeddings, wherein the plurality of elements represent the identified plurality of missing entities and relations. Then, the prioritization module 215 estimates a distance of the embedded plurality of elements from the determined context, the at least one graphical instance and the determined appropriate domain specific graphical schema using the generated plurality of word embeddings. Further, the module 215 estimates a priority level for each of the plurality of elements based on the estimated distance, and generates a non-ascending ordered list of the plurality of elements based on the estimated priority level, wherein the non-ascending ordered list comprises highest priority element at a top position and a lowest priority element at a bottom position.

In one embodiment, if there is any overlap between at least two entities based on the estimated distance, then the prioritization module 215 determines an entity among the at least two entities having a greater number of relations mapping with remaining entities within the determined appropriate domain specific graphical schema, assigns a higher priority level to the determined entity, and generates the non-ascending ordered list of the plurality of elements based on assigned priority level.

Figure 4A:
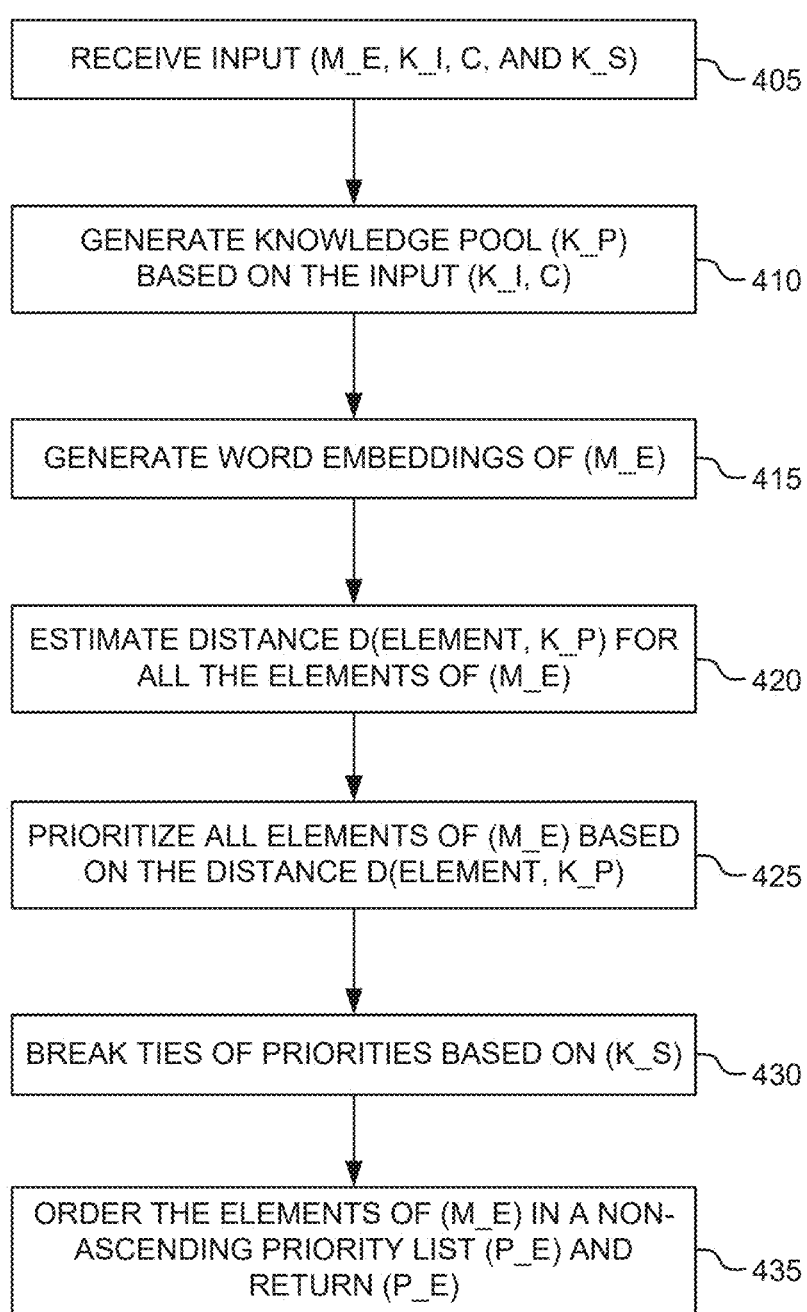
FIG. 4A depicts a flowchart illustrating a method of prioritizing the identified plurality of missing entities, in accordance with an embodiment of the present disclosure.

FIG. 4A depicts a flowchart illustrating a method of prioritizing the identified plurality of missing entities, in accordance with an embodiment of the present disclosure. As shown at step 405, the input the prioritization module 215 are the list of identified missing entities (M_E), KG instance (K_i), the context (C), and the KG schema (K_s). Said inputs are received from the context determination module 205, missing entity identification module 215 and the knowledge database 110.

At step 410, the prioritization module 215 generates a knowledge pool (K_P) by integrating the KG instance (K_i) and the context (C). That is, the prioritization module 215 embeds the KG instance (K_i) and the context (C) using word embedding techniques, which transform them into numerical representations that capture their meanings and relationships. The resultant overall embedded information forms the current knowledge pool (K_P) which is used by the prioritization module 215 to make informed decisions about missing entity prioritization.

Then, the prioritization module 215 embeds all the identified missing entities (M_E) with the selected word embedding technique, as shown at step 415. All the missing entities (M_E) represent the identified missing entities and relations. Then, for all the missing entities (M_E), the prioritization module 215 estimates a distance d (element, k_P) between the element, and the current knowledge pool (K_P) based on the given word embeddings, as shown at step 420. In an embodiment, cosine similarity method is used for estimating the distance d (element, k_P).

At step 425, the prioritization module 215 prioritizes all the missing elements (M_E) based the estimated distance d (element, k_P). That is, the prioritization module 215 estimates the priority of the concepts (entities or relations) according to their distances from the current knowledge pool (k_P), wherein smaller distance indicates higher priority.

In an embodiment, if a distance between any two missing entities of (M_E) are equal, then the prioritization module 215 prioritizes the entity with greater number of relations with other entities withing the knowledge schema than its less related/connected competitor, as shown at step 430. Then, in an embodiment of the present disclosure, the prioritization module 215 orders all elements of (M_E) in a non-ascending ordered list (P_E) based on the estimated priorities and returns the order list (P_E), as shown at step 435. In this list, the missing element with highest priority will be the top element of the list and the lowest priority element will be the last element.

Figure 4C:
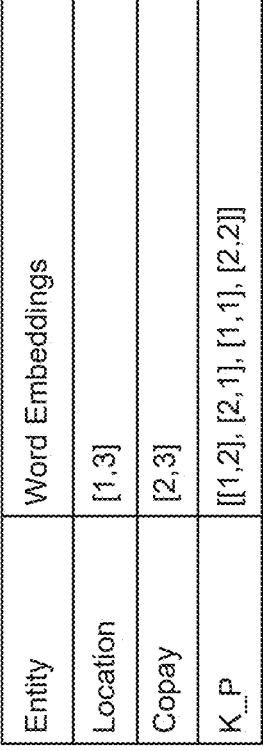
FIG. 4B and FIG. 4C depicts an example KG instance and word embeddings for the entities, in accordance with an embodiment of the present disclosure.
Figure 4B:
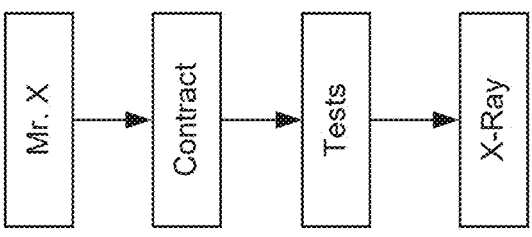

Considering the example shown in FIG. 3B, the missing entities (M_E) are [location, copay] and an example KG instance (K_i) and word embeddings for the entities are depicted in FIG. 4B and FIG. 4C, respectively. Considering the word embeddings, the prioritization module 215 determines cosine similarity between element and (K_P) and determines the distance as:

d (location, K_P): (1-0.40)=0.6
d (copay, K_P): (1-0.998)=0.002

Based on the distance, the prioritization module 215 prioritizes the missing entity "copay" over the missing entity "location" in the order priority list (P_E) because d (copay, K_P) <d (location, K_P). The prioritization of the missing entities enables the system 110 to identify important or relevant information, which will be retrieved using RAG-based system 120, according to the given context and the given KG instance. Hence, prioritization of the missing entities facilitates generation of response(s) specific to the given context and the given KG instance.

As described, upon receiving the query from the user, the system 110 queries the KG 135 and fetches the information, if available. Else, the system 110 identifies the plurality of missing entities, that is the entities missing in the KG 135, based on the input query, the context, the KG schema and the KG instance, and prioritizes the plurality of missing entities, as described.

In an embodiment of the present disclosure, upon prioritizing missing entities, system 110 generates at least one sub-query for the each of the identified plurality of missing entities based on the priority, retrieves a relevant content corresponding to the generated at least one sub-query from a plurality of external data sources using the RAG-based system 120. Further, the system 110 generates at least one response to the received input data by augmenting the received input data with the retrieved relevant content and outputs the generated at least one response on a user interface of the user device 105. In an embodiment, the system 110 further update the at least one graphical instance with the retrieved relevant information.

Referring to FIG. 2, the query augmentation module 220 generates at least one sub-query for the each of the identified plurality of missing entities. In an embodiment, the query augmentation module 220 determines a set of pre-defined rules corresponding to the identified plurality of missing entities and the determined context and generates the at least one sub-query for the prioritized plurality of missing entities based on the determined set of pre-defined rules. Hence, the query augmentation module 220 uses the ordered list (P_E) of the plurality of missing entities (M_E), current context (C), original query (Q), Rule set (R) for generating sub-queries to the RAG-based system 120 and hence for fetching relevant information from the RAG-based system, 120.

In one embodiment of the present disclosure, upon receiving the ordered list (P_E) of the plurality of missing entities (M_E), the query augmentation module 220 extracts the entities and their corresponding values from the original query (Q) and context (C). Then the query augmentation module 220 generates a sub-query (Q_s) for each of the missing entities from the prioritized list (P_E) according to rule set (R). In an embodiment of the present disclosure, the query augmentation module 220 schedules the generated sub-queries by considering the structure of the KG schema, taking into account how the entities and their relationships are organized in the KG 135. Then the module 220 aligns the missing entities according to the dependencies of the missing entities, and the information retrieval module 225 retrieves relevant data (relevant information) from the RAG-based system 120.

Upon receiving the sub-queries from the information retrieval module 225, in an embodiment of the present disclosure, the RAG-based system 120 fetches the relevant information from the one or more data sources 140A and 140B and returns the responses to the information retrieval module 225. In another embodiment, the RAG-based system 120 correlates the received sub-queries with a plurality of context and entities of the RAG model and determine a confidence score for each of the sub-queries based on the correlation, wherein the confidence score indicates relevancy level of the correlated sub-queries with the context and the entities. Then the RAG-based system 120 fetches information based on the relevancy score and returns the responses to the information retrieval module 225.

In an embodiment, upon receiving the relevant information from the RAG-based system 120, the response generation module 230 generates the response to the original user query by using the responses received for the sub-queries and presents the response on the interface of the user device 105.

In another embodiment, upon receiving the relevant information from the RAG-based system 120, the query augmentation module 230 augments the original query based on the relevant information retrieved from the RAG-based system 120 for each of the sub-queries. That is, based on the relevant information retrieved using the sub-queries and the original query (Q), the query augmentation module 230 generates an augmented query (Q_A), wherein:

$$(Q\_A) = Q \wedge_{i=1}^{|P\_E|} (\text{element}_i = \text{data}_i) \qquad \text{Eq. (2)}$$

In the above equation (2), $\text{data}_i$ is the information retrieved for $\text{element}_i$ of (P_E). That is, the responses, which correspond to the missing entities, retrieved from the RAG-based system 120 are used to augment the original query. Upon generating the augmented query (Q_A), the information retrieval module 225 further uses the augmented query (Q_A) to fetch relevant information from the RAG-based system 120. The augmented query (Q_A) enhances the quality of the responses retrieved from the RAG-based system 120 and the retrieved relevant information is presented to the user on an interface of the user device 105.

Considering the example "How much does Mr. X need to pay for the X-ray?", for generating the sub-queries, the input the query augmentation module 220 is the KG instance for Mr. X, the KG schema for patients, and the rule set (R) for generating the sub-queries.

Considering:

The missing Entities from KG instance as [copay, out-of-network discount, in-network discount, locations], Prioritized list (P_E) as <copay, locations, in-network-discount, out-of-network discount>

The set of entities extracted from the query (Q) and the context (C) as (E_QC)=[<patient='John Doe'>, <test='X-ray'>, <location='Hokkaido'>] and Rule R: What is the value of missing entity if $$\wedge_{j=1}^{|E\_QC|} (\text{element}_j = \text{data}_j)$$

The query augmentation module 220 may generate multiple sub-queries to fetch the information missing in the KG 135 from the RAG-based system 120. Below are the example sub-queries generated by the query augmentation module 220 along with the responses received from the RAG-based system 120.

Subquery 1: What is the value of Copay if patient='Mr. X AND test='X-ray'?
Response: 1.
Subquery 2: What is the value of Copay if patient='Mr. X' AND test='X-ray' AND location='Location A'?
Response: 1.
Subquery 3: What is the value of in-network discount amount if patient='Mr. X' AND test='X-ray' AND Copay=1 AND locations='Location 1'
Response: 80%.
Subquery 4: What is the value of out-of-network discount if patient='Mr. X' AND test='X-ray' AND Copay=1 AND locations='Location A'?
Response: 20

Upon receiving the responses to the sub-queries, the query augmentation module 220 uses the responses and original query (Q) and generates an augmented query (Q_A).

(Q_A)=How much does Mr. X need to pay for the X-ray if Copay=1 AND locations='Location A' AND in-network-discount=80% AND out-of-network-discount=20%?

Upon receiving the response (relevant information) for the augmented query, the response generation module 230 generates the response and presents to the user. In an embodiment of the present disclosure, the KG updating module 235 updates the KG instances (where the information is missing) by using the relevant information retrieved from the RAG-based system 120. To update the KG instances, the KG updating module 235 identifies at least one of relevant entities, relations, literals, and classes from the generated at least one response and extracts a relevant sub-schema from the appropriate domain specific graphical schema, wherein the extracted relevant sub-schema includes a structure similar to a sub-part of the generated at least one graphical instance. Then the KG updating module 235 identifies critical missing entities from the prioritized plurality of missing entities based on the distance between the identified plurality of missing entities from the determined context and the generated at least one graphical instance and based on heuristics. Then KG updating module 235 updates the at least one graphical instance with identified critical missing entities from the prioritized plurality of missing entities and the identified at least one of relevant entities, relations, literals, and classes of the generated at least one response.

As described, the input to the KG updating module 235 is the KG instance (K_i), KG schema (K_s), list of prioritized missing entities along with the distances (P_D), current context (C), and the generated response of augmented query (R_A). Upon receiving the input, the KG updating module 235 identifies relevant entities, relations, literals, and classes from the generated response of the augmented query (R_A). Then the KG updating module 235 extracts the most relevant sub-schema (T_1), from the KG schema (K_s). The extracted sub-schema (T_1) is relevant with respect to the given KG instance (K_i) and structurally similar to a sub-part of the given KG instance (K_i). Further, the KG updating module 235 identifies most important missing entities from the prioritized list of missing entities (P_D). In one embodiment, the most important missing entities are identified based on the estimated distances at the time of prioritization of the identified missing entities. Then the KG updating module 235 excludes the unimportant missing entities based on heuristics. In one implementation, the KG updating module 235 is configured to select top 50% of the prioritized missing entities. However, the KG updating module 235 is configurable to select the number of missing entities. Further, the KG updating module 235 extracts (T'_1) only the most important part of the sub-schema (T_1) and instantiates the important parts of (T'_1) based on the retrieved information and updates the sub-graph with the original KG instance, (K'_i)=(K_i)U(T'_1). The manner in which the KG updating module 235 updates the KG instance is described in detail below, along with an example.

Figure 5B:
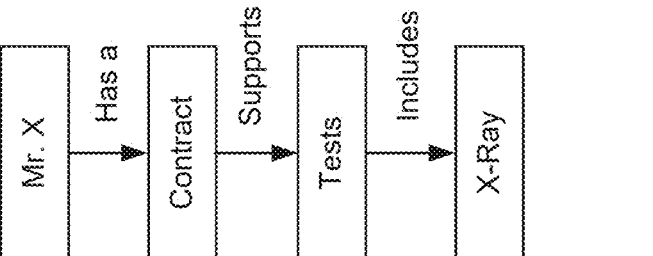
FIG. 5A and FIG. 5B depicts exemplary input KG schema and input KG instance to the KG updating module, in accordance with an embodiment of the present disclosure.
Figure 5A:
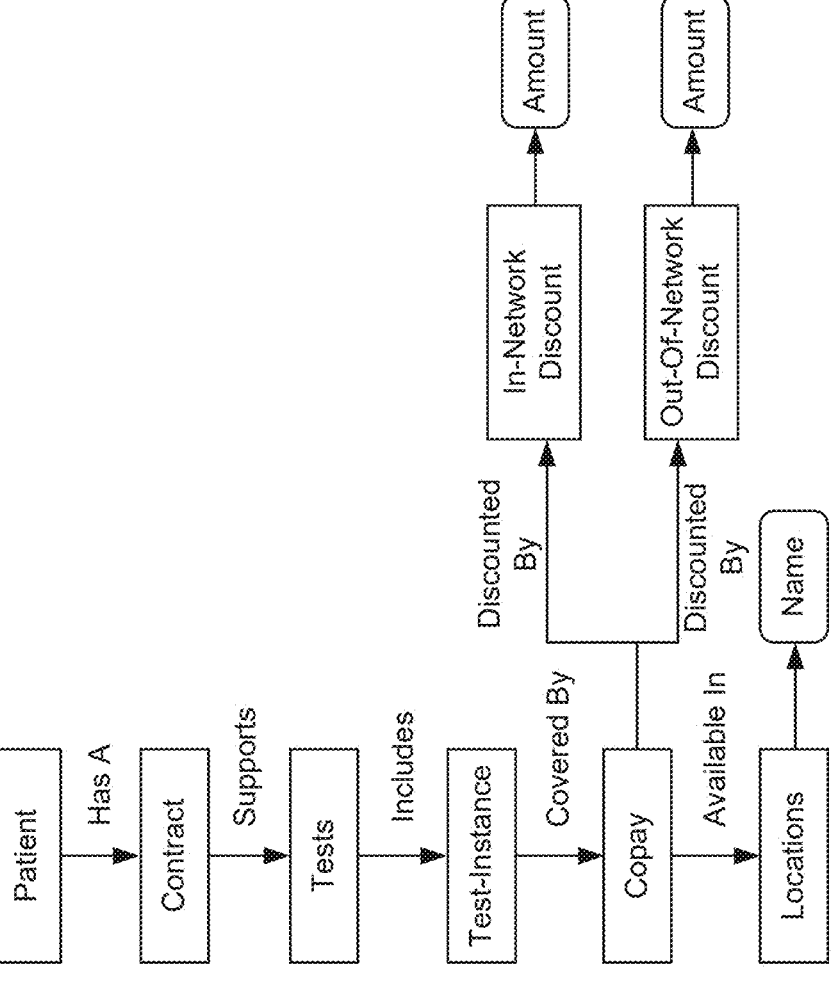

FIG. 5A and FIG. 5B depicts exemplary input KG schema and input KG instance to the KG updating module, in accordance with an embodiment of the present disclosure. Considering the example described in the present disclosure, the input further includes:

Prioritized list of missing entities with distance: <<copay, d1>, <locations, 1.5*d1><in-network discount, 5*d1>, <out-of-network discount, 20*d1>>

Current context: location='Location A'

Response R_A: <<copay=1>, <in-network discount=80%>, <out-network discount=20%>>

Heuristic: consider all the concepts if distance<=2*minimum_of_all_distances

Minimum of all distances=d1

Figure 5D:
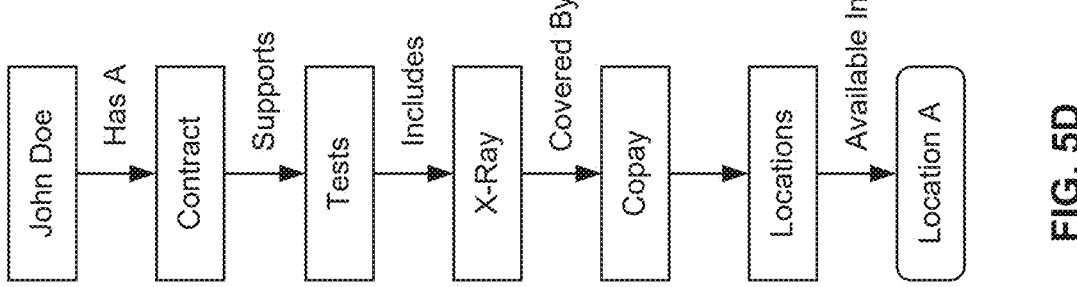
FIG. 5D depicts an updated KG instance, in accordance with an embodiment of the present disclosure.
Figure 5C:
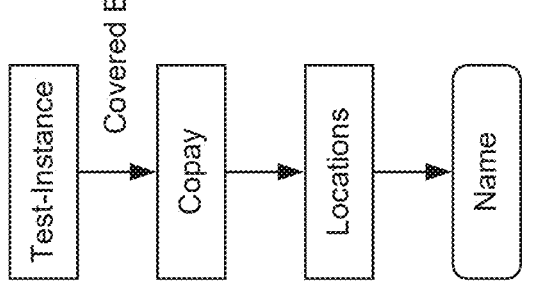
FIG. 5C depicts an extracted KG sub-schema, in accordance with an embodiment of the present disclosure.

Based on the distance and heuristic, the KG updating module 235 selects prioritized list of missing entities: <<copay, d1>, <locations, 1.5*d1>>, and further extracts the KG sub-schema based on the selected prioritized list of missing entities. FIG. 5C depicts an extracted KG sub-schema, in accordance with an embodiment of the present disclosure. Then the KG updating module 235 updates the KG instance based on the contextual information and the response received from the RAG-based system 120 for the augmented query. FIG. 5D depicts an updated KG instance, in accordance with an embodiment of the present disclosure.

FIG. 6 depicts a flowchart illustrating a method for generating a response to a query, in accordance with an embodiment of the present disclosure. At step 605, the system 110 receives an input data and determine a context of the input data. The input data is received from the user device 105 associated with a user and includes at least one natural language query for performing a task, for example a natural language query for fetching information related to a patient. Upon receiving the input query, the context is determined by parsing at least one keyword comprised within the input query.

At step 610, the system 110 determines an appropriate domain specific graphical schema corresponding to the received input data based on the determined context. Then, the system 110 analyses the determined context and at least one graphical instance corresponding to the determined appropriate domain specific graphical schema to determine if the content relevant to the context is present in the KG 135 or not. If the content is present, then the system 110 fetches the content and presents on an interface of the user device 105.

If the content is not available in the KG 135, the system 110 identifies a plurality of missing entities by analyzing the determined context and at least one graphical instance corresponding to the determined appropriate domain specific graphical schema, as shown at step 615. As described, the system 110 determine a set of triplets, having at least one of a subject, a predicate, an object and relations, from the received input data and the determined context of the received input data using natural language processing techniques, and generates a union of the triplets derived from the received input data and the determined context based on the determined set of triplets. Then the system 110 maps the determined set of triplets to corresponding relations in the determined appropriate domain specific graphical schema, queries the determined appropriate domain specific graphical schema using the generated union of triplets and the mapped relations, and then identifies the plurality of missing relations and entities relevant to the received input data based on the mapped relations and a response received from the determined appropriate domain specific graphical schema.

Upon identifying the missing entities, the system 110 prioritizes the identified plurality of missing entities based on a distance between the identified plurality of missing entities from the determined context and the analysed at least one graphical instance, as shown at step 620. In one embodiment, the system 110 initially generates a plurality of word embeddings for each of the identified plurality of missing entities, the determined context, the at least one graphical instance and the determined appropriate domain specific graphical schema. Then the system 110 embeds a plurality of elements to each of the generated plurality of word embeddings, wherein the plurality of elements represents the identified plurality of missing entities and relations and estimates the distance of the embedded plurality of elements from the determined context, the generated at least one graphical instance and the determined appropriate domain specific graphical schema using the generated plurality of word embeddings. Then the system 110 estimates a priority level for each of the plurality of elements based on the estimated distance, and generate a non-ascending ordered list of the plurality of elements based on the estimated priority level, wherein the non-ascending ordered list comprises highest priority element at a top position and a lowest priority element at a bottom position.

Then the system 110 generates at least one sub-query for the each of the identified plurality of missing entities based on the priority. In an embodiment, the system 110 determines a set of pre-defined rules corresponding to the identified plurality of missing entities and the determined context and generates the at least one sub-query for the prioritized plurality of missing entities based on the determined set of pre-defined rules. Hence, the system 110 uses the ordered list (P_E) of the plurality of missing entities (M_E), current context (C), original query (Q), Rule set (R) for generating sub-queries to the RAG-based system 120 and hence for fetching relevant information from the RAG-based system, 120.

Further, upon generating the at least one sub-query, the system 110 retrieves a relevant content corresponding to the generated at least one sub-query from the one or more data sources 140A and 140B using the RAG-based system 120, as shown at step 630. Furthermore, the system 110 augments the original query using the context and the responses received for the subqueries and uses the augmented query to fetch relevant information from the RAG-based system 120, as shown at step 635. Then the system 110 presents the relevant information to the user by displaying on an user interface of the user device 105.

Furthermore, in an embodiment of the present disclosure, the system 110 updates the at least one graphical instance with the retrieved relevant content. To update the KG 135, the system 110 identifies at least one of relevant entities, relations, literals, and classes from the generated at least one response and extracts a relevant sub-schema from the appropriate domain specific graphical schema, wherein the extracted relevant sub-schema comprises a structure similar to a sub-part of the generated at least one graphical instance. Further, the system 110 identifies critical missing entities from the prioritized plurality of missing entities based on the distance between the identified plurality of missing entities from the determined context and the generated at least one graphical instance and based on heuristics, and updates the at least one graphical instance with identified critical missing entities from the prioritized plurality of missing entities and the identified at least one of relevant entities, relations, literals, and classes of the generated at least one response.

As described, the system utilizes a Knowledge Graph (KG) and RAG-assisted system to enhance response generation by retrieving contextual missing information from source documents and other relevant materials when necessary. This context-specific information aids the system in producing more accurate responses to a given query. The system focuses on the query augmentation process, which enables the generation of responses from a RAG-assisted KG-based system when the KG is unable to provide relevant information due to its incompleteness. Additionally, the system enhances the incomplete KG instance using the retrieved information, thereby improving overall response quality. For example, upon receiving a query from a user, the system initially determines a context of the query and based on the determined context, the system identifies a relevant domain-specific graphical schema from a KG. Then, the system analyses the determined context and at least one graphical instance corresponding to the determined appropriate domain specific graphical schema to determine if the content relevant to the context is present in the KG or not. If the content is present, then the system fetches the content and presents on an interface of the user device. Else, the system identifies one or more missing information from the at least one graphical instance, prioritizes the missing information based on the given KG instance and the context, augments the query based on the prioritization and retrieves the missing information with the help of the RAG based system which extracts relevant information from one or more sources and documents. Upon retrieving the relevant information, the system presents the relevant information to the user and further updates the incomplete KG instance based on the retrieved information and the prioritized concepts.

As described, the system disclosed in the present disclosure enable efficient conversion of mainframe code to a technical design document and conversion of the technical design document to a native language code.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in a generic classical processor system and a quantum computing system.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:

a processor; and a memory communicably coupled to the processor, wherein the memory comprises processor-executable instructions which, when executed by the processor, cause the processor to:

receive an input data for performing a task, wherein the input data comprises at least a natural language query received from a user device;

determine a context of the received input data by parsing at least one keyword comprised within the received input data;

determine an appropriate domain specific graphical schema corresponding to the received input data based on the determined context;

identify a plurality of missing entities from the domain specific graphical schema by analyzing the determined context and at least one graphical instance corresponding to the determined appropriate domain specific graphical knowledge schema, wherein each of the at least one graphical instance corresponds to one of an explicit missing entity and an implicit missing entity;

prioritize the identified plurality of missing entities based on a distance between the identified plurality of missing entities from the determined context and the analyzed at least one graphical instance;

generate at least one sub-query for the each of the identified plurality of missing entities based on the priority;

retrieve a relevant content corresponding to the generated at least one sub-query from a plurality of external data sources using a Retrieval Augmented Generation (RAG) framework;

generate at least one response to the received input data by augmenting the received input data with the retrieved relevant content; and output the generated at least one response on a user interface of the user device and update the at least one graphical instance with the retrieved relevant content.

2. The system of claim 1, wherein to identify the plurality of missing entities by analyzing the determined context and the at least one graphical instance corresponding to the determined appropriate domain specific graphical knowledge schema, the processor is configured to:

determine a set of triplets, comprising at least one of a subject, a predicate, an object and relations, from the received input data and the determined context of the received input data using natural language processing techniques;

generate a union of the triplets derived from the received input data and the determined context based on the determined set of triplets;

map the determined set of triplets to corresponding relations in the determined appropriate domain specific graphical schema;

query the determined appropriate domain specific graphical schema using the generated union of triplets and the mapped relations; and identify a plurality of missing relations and entities relevant to the received input data based on the mapped relations and a response received from the determined appropriate domain specific graphical schema.

3. The system of claim 1, wherein to prioritize the identified plurality of missing entities based on a distance between the identified plurality of missing entities from the determined context and the at least one graphical instance, the processor is configured to:

generate a plurality of word embeddings for each of the identified plurality of missing entities, the determined context, the at least one graphical instance and the determined appropriate domain specific graphical knowledge schema;

embed a plurality of elements to each of the generated plurality of word embeddings, wherein the plurality of elements represents the identified plurality of missing entities and relations;

estimate the distance of the embedded plurality of elements from the determined context, the generated at least one graphical instance and the determined appropriate domain specific graphical schema using the generated plurality of word embeddings;

estimate a priority level for each of the plurality of elements based on the estimated distance; and generate a non-ascending ordered list of the plurality of elements based on the estimated priority level, wherein the non-ascending ordered list comprises highest priority element at a top position and a lowest priority element at a bottom position.

4. The system of claim 3, wherein the processor is further configured to:

determine an overlap between at least two entities based on the estimated distance;

determine an entity among the at least two entities comprising a greater number of relations mappings with remaining entities within the determined appropriate domain specific graphical knowledge schema;

assign a higher priority level to the determined entity; and generate the non-ascending ordered list of the plurality of elements based on assigned priority level.

5. The system of claim 1, wherein to generate at least one sub-query for the each of the identified plurality of missing entities based on the priority, the processor is configured to:

determine a set of pre-defined rules corresponding to the identified plurality of missing entities and the determined context; and generate the at least one sub-query for prioritized plurality of missing entities based on the determined set of pre-defined rules.

6. The system of claim 1, wherein to retrieve the relevant content corresponding to the generated at least one sub-query from a plurality of external data sources using the Retrieval Augmented Generation (RAG) framework, the processor is configured to:

correlate the generated at least one sub-query with a plurality of context and entities of the Retrieval Augmented Generation (RAG) framework;

determine a confidence score for the generated at least one sub-query based on the correlation, wherein the confidence score indicates relevancy level of the correlated at least one sub-query; and identify the relevant content in the Retrieval Augmented Generation (RAG) framework corresponding to correlated at least one sub-query based on the determined confidence score, wherein the relevant content matches with the identified plurality of missing entities and the determined context.

7. The system of claim 1, wherein to generate the at least one response to the received input data by augmenting the received input data with the retrieved relevant content, the processor is configured to:

determine a structure of the appropriate domain specific graphical schema, wherein the structure comprises a plurality of edges indicating a plurality of directions and each direction corresponds to a plurality of relations, and wherein the plurality of relations comprise a dependency based on the direction of the plurality of edges;

modify the relevant content corresponding to the generated at least one sub-query based on the determined structure; and generate the at least one response to the received input data by augmenting the received input data with the modified relevant content.

8. The system of claim 1, wherein to update the at least one graphical instance with the retrieved relevant content, the processor is configured to:

identify at least one of relevant entities, relations, literals, and classes from the generated at least one response;

extract a relevant sub-schema from the appropriate domain specific graphical schema, wherein the extracted relevant sub-schema comprises a structure similar to a sub-part of the generated at least one graphical instance;

identify critical missing entities from the prioritized plurality of missing entities based on the distance between the identified plurality of missing entities from the determined context and the generated at least one graphical instance and based on heuristics; and updated the at least one graphical instance with identified critical missing entities from the prioritized plurality of missing entities and the identified at least one of relevant entities, relations, literals, and classes of the generated at least one response.

9. A method comprising:

receiving, by a processor, an input data for performing a task, wherein the input data comprises at least one of a natural language query received from a user device;

determining, by the processor, a context of the received input data by parsing at least one keyword comprised within the received input data;

determining, by the processor, an appropriate domain specific graphical schema corresponding to the received input data based on the determined context;

identifying, by the processor, a plurality of missing entities from the domain specific graphical schema by analyzing the determined context and at least one graphical instance corresponding to the determined appropriate domain specific graphical knowledge schema, wherein each of the at least one graphical instance corresponds to one of an explicit missing entity and an implicit missing entity;

prioritizing, by the processor, the identified plurality of missing entities based on a distance between the identified plurality of missing entities from the determined context and the analysed analyzed at least one graphical instance;

generating, by the processor, at least one sub-query for each of the identified plurality of missing entities based on the priority;

retrieving, by the processor, a relevant content corresponding to the generated at least one sub-query from a plurality of external data sources using a Retrieval Augmented Generation (RAG) framework;

generating, by the processor, at least one response to the received input data by augmenting the received input data with the retrieved relevant content; and outputting, by the processor, the generated at least one response on a user interface of the user device and updating the at least one graphical instance with the retrieved relevant content.

10. The method of claim 9, wherein identifying the plurality of missing entities by analyzing the determined context and the at least one graphical instance corresponding to the determined appropriate domain specific graphical knowledge schema comprises:

determining, by the processor, a set of triplets, comprising at least one of a subject, a predicate, an object and relations, from the received input data and the determined context of the received input data using natural language processing techniques;

generating, by the processor, a union of the triplets the received input data and the determined context based on the determined set of triplets;

mapping, by the processor, the determined set of triplets to corresponding relations in the determined appropriate domain specific graphical knowledge schema;

querying, by the processor, the determined appropriate domain specific graphical knowledge schema using the generated union of triplets and the mapped relations; and identifying, by the processor, a plurality of missing relations and entities relevant to the received input data based on the mapped relations and a response received from the determined appropriate domain specific graphical knowledge schema.

11. The method of claim 9, wherein prioritizing the identified plurality of missing entities based on a distance between the identified plurality of missing entities from the determined context and the at least one graphical instance comprises:

generating, by the processor, a plurality of word embeddings for each of the identified plurality of missing entities, the determined context, the at least one graphical instance and the determined appropriate domain specific graphical knowledge schema;

embedding, by the processor, a plurality of elements to each of the generated plurality of word embeddings, wherein the plurality of elements represent the identified plurality of missing entities and relations;

estimating, by the processor, the distance of the embedded plurality of elements from the determined context, the generated at least one graphical instance and the determined appropriate domain specific graphical schema using the generated plurality of word embeddings;

estimating, by the processor, a priority level for each of the plurality of elements based on the estimated distance; and generating, by the processor, a non-ascending ordered list of the plurality of elements based on the estimated priority level, wherein the non-ascending ordered list comprises highest priority element at a top position and a lowest priority element at a bottom position.

12. The method of claim 11, further comprises:

determining, by the processor, an overlap between at least two entities based on the estimated distance;

determining, by the processor, an entity among the at least two entities comprising a greater number of relations mappings with remaining entities within the determined appropriate domain specific graphical knowledge schema;

assigning, by the processor, a higher priority level to the determined entity; and generating, by the processor, the non-ascending ordered list of the plurality of elements based on assigned priority level.

13. The method of claim 9, wherein generating at least one sub-query for the each of the identified plurality of missing entities based on the priority comprises:

determining, by the processor, a set of pre-defined rules corresponding to the identified plurality of missing entities and the determined context; and generating, by the processor, the at least one sub-query for prioritized plurality of missing entities based on the determined set of pre-defined rules.

14. The method of claim 9, wherein retrieving the relevant content corresponding to the generated at least one sub-query from a plurality of external data sources using the Retrieval Augmented Generation (RAG) framework comprises:

correlating, by the processor, the generated at least one sub-query with a plurality of context and entities of the Retrieval Augmented Generation (RAG) framework;

determining, by the processor, a confidence score for the generated at least one sub-query based on the correlation, wherein the confidence score indicates relevancy level of the correlated at least one sub-query; and identifying, by the processor, the relevant content in the Retrieval Augmented Generation (RAG) framework corresponding to correlated at least one sub-query based on the determined confidence score, wherein the relevant content matches with the identified plurality of missing entities and the determined context.

15. The method of claim 9, wherein generating the at least one response to the received input data by augmenting the received input data with the retrieved relevant content comprises:

determining, by the processor, a structure of the appropriate domain specific graphical knowledge schema, wherein the structure comprises a plurality of edges indicating a plurality of directions and each direction corresponds to a plurality of relations, and wherein the plurality of relations comprise a dependency based on the direction of the plurality of edges;

modifying, by the processor, the relevant content corresponding to the generated at least one sub-query based on the determined structure; and generating, by the processor, the at least one response to the received input data by augmenting the received input data with the modified relevant content.

16. The method of claim 9, wherein updating the at least one graphical instance with the retrieved relevant content comprises:

identifying, by the processor, at least one of relevant entities, relations, literals, and classes from the generated at least one response;

extracting, by the processor, a relevant sub-schema from the appropriate domain specific graphical schema, wherein the extracted relevant sub-schema comprises a structure similar to a sub-part of the generated at least one graphical instance;

identifying, by the processor, critical missing entities from the prioritized plurality of missing entities based on the distance between the identified plurality of missing entities from the determined context and the generated at least one graphical instance and based on heuristics; and updating, by the processor, the at least one graphical instance with identified critical missing entities from the prioritized plurality of missing entities and the identified at least one of relevant entities, relations, literals, and classes of the generated at least one response.

17. A non-transitory computer readable medium comprising a processor-executable instructions that cause a processor to:

receive an input data for performing a task, wherein the input data comprises at least a natural language query received from a user device;

determine a context of the received input data by parsing at least one keyword comprised within the received input data;

determine an appropriate domain specific graphical schema corresponding to the received input data based on the determined context;

identify a plurality of missing entities from the domain specific graphical schema by analyzing the determined context and at least one graphical instance corresponding to the determined appropriate domain specific graphical knowledge schema, wherein each of the at least one graphical instance corresponds to one of an explicit missing entity and an implicit missing entity;

prioritize the identified plurality of missing entities based on a distance between the identified plurality of missing entities from the determined context and the analysed analyzed at least one graphical instance;

generate at least one sub-query for the each of the identified plurality of missing entities based on the priority;

retrieve a relevant content corresponding to the generated at least one sub-query from a plurality of external data sources using a Retrieval Augmented Generation (RAG) framework;

generate at least one response to the received input data by augmenting the received input data with the retrieved relevant content; and output the generated at least one response on a user interface of the user device and update the at least one graphical instance with the retrieved relevant content.

18. The non-transitory computer readable medium of claim 17, wherein to identify the plurality of missing entities by analyzing the determined context and the at least one graphical instance corresponding to the determined appropriate domain specific graphical knowledge schema, the processor-executable instructions cause the processor to:

determine a set of triplets, comprising at least one of a subject, a predicate, an object and relations, from the received input data and the determined context of the received input data using natural language processing techniques;

generate a union of the triplets derived from the received input data and the determined context based on the determined set of triplets;

map the determined set of triplets to corresponding relations in the determined appropriate domain specific graphical knowledge schema;

query the determined appropriate domain specific graphical knowledge schema using the generated union of triplets and the mapped relations; and identify a plurality of missing relations and entities relevant to the received input data based on the mapped relations and a response received from the determined appropriate domain specific graphical knowledge schema.

* * * * *